March 8, 1960  S. YERKOVICH  2,928,005
MOTOR-DRIVEN CASSETTE RETURNING MEANS
FOR X-RAY SPOT FILM DEVICES
Filed Nov. 29, 1955

INVENTOR.
SIMON YERKOVICH
BY
Le Roy J. Leishman
ASSIGNEE

United States Patent Office 2,928,005
Patented Mar. 8, 1960

2,928,005

MOTOR-DRIVEN CASSETTE RETURNING MEANS FOR X-RAY SPOT FILM DEVICES

Simon Yerkovich, Los Angeles, Calif., assignor to Le Roy J. Leishman, Los Angeles, Calif.

Application November 29, 1955, Serial No. 549,774

4 Claims. (Cl. 250—66)

The invention herein described pertains to X-ray equipment and more particularly to means for returning the cassette in a spot film device to a rest position after an exposure has been made.

In spot film devices, it is required that the cassette containing the film that is to be exposed be moved very rapidly into a particular position with respect to the X-ray beam for exposing a portion or all of the film and that the cassette then be returned to a rest or home position outside the X-ray beam. In automatic or semi-automatic spot film devices, the cassette is moved from its home or rest position to its exposure position either by a spring or by motor actuated means. In some of the devices in which a spring is used for moving the cassette to the exposure position, the cassette is returned by manually operable means and in others the return is effected by a motor drive. Spot film devices employing a motor for moving a cassette to the exposure position invariably also employ a motor for the return movement.

The present invention is concerned with improvements in the mechanism for returning the cassette to its rest position after the exposure, and it is particularly adapted for use in connection with spot film devices in which the carriage is brought into the exposure position by means of a spring. The illustrated embodiment herein described is a component in a complete spot film device of that type shown and explained in the co-pending application of myself and Le Roy J. Leishman, Serial No. 549,- 773, now U.S. Patent No. 2,811,648. The spot film device which is the subject of that application employs a motor-driven chain for returning the cassette to its home position. In that spot film device, and in most others, the cassette is placed in a carriage, and it is of course the carriage that is moved into the vicinity of the X-ray beam by means of the spring, the carriage serving to transport the cassette. The motor-driven chain returns the carriage to its rest position after the exposure. In the said spot film device, as well as in others, the return of the carriage cocks and stores energy in the actuating spring. After such return, the carriage is latched in its home or rest position. Means are provided on the chain for engaging a suitable member on the carriage, and the chain and the member on the carriage must of course become disengaged after the carriage has returned home. The disengagement of these parts while the spring is applying a force to the carriage that tends to move it toward the X-ray beam, complicates the problem of disconnecting the chain from the co-operating member on the carriage. In order to effect a smooth disengagement, various arrangements have been suggested, but none has heretofore been entirely satisfactory. Accordingly, one object of the present invention is to afford means for returning the carriage that will afterwards disengage in a simple manner.

Another object is to provide a mechanism of the class described that will not produce objectionable noise and vibration at the time of disengagement.

In order to make it possible for the radiologist to resume the fluoroscopic examination of his patient immediately after making a radiograph on the film within the cassette, it is desirable that the carriage return to its rest position within a second or less. This generally requires that the carriage and cassette move a distance of about fifteen inches and come smoothly to rest within this interval of time. Despite the presence of a spring tending to pull the carriage in an opposite direction, the carriage and the cassette nevertheless attain considerable momentum in their brief and rapid journey, and problems accordingly arise in connection with the required rapid deceleration. It is preferable, of course, that the carriage come to rest, or decelerate, with a harmonic motion. Accordingly, another object of the present invention is to bring the carriage to a smooth stop with a movement that approximates harmonic motion.

Another object is to attain the aforementioned objectives with equipment that is rugged and unlikely to get out of order.

Still other objects will appear as the specification proceeds.

Figure 1:
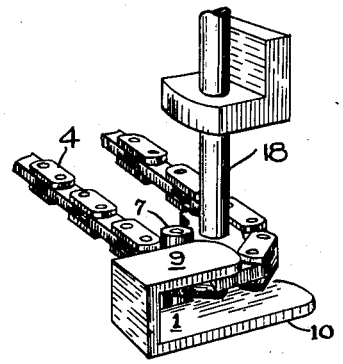
Fig. 1 is a fragmentary perspective view of a driving shaft and sprocket with the chain meshing therewith and lugs upon the chain in engagement with a member suitable for establishing a driving connection between the lug and the carriage with which the member may be attached.
Figure 2:
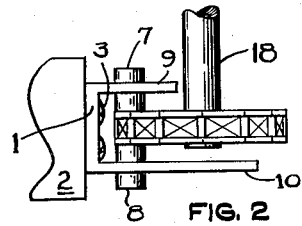
Fig. 2 is an end view of the chain assembly showing the lugs or dogs in engagement with the driving bracket on the carriage.

The bifurcated member 1 in the various figures is attached to the carriage 2 by any appropriate means, such as by the screws 3 of Fig. 2. A chain 4 meshes with the driving sprocket 5 and an idler sprocket 6. The chain and bifurcated member are so disposed that the latter straddles one side of the chain, as indicated in Figs. 1 and 2, and the chain is provided with a double lug or pair of lugs 7 and 8 of sufficient length to engage the short and long arms 9 and 10 respectively of the bifurcated member 1.

Figure 3:
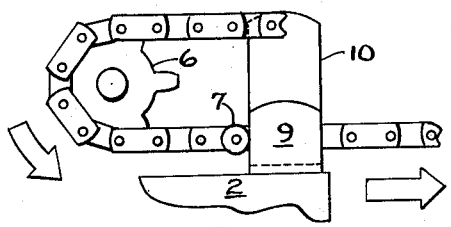
Fig. 3 is a plan view of the assembly of Figs. 1 and 2, showing the dog driving the carriage (shown in fragment) in the direction of the arrow.
Figure 4:
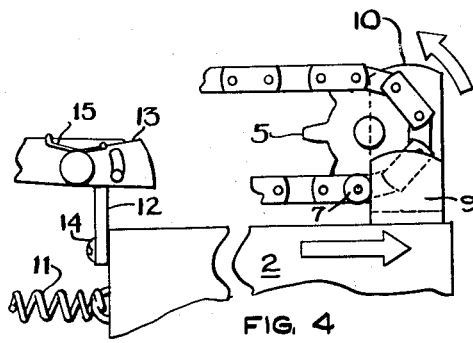
Fig. 4 shows the carriage in fragment just before it has completed its return movement to its rest position. This view also shows the actuating spring and the latch for releasably holding the carriage in said position.

The present invention is not concerned per se with the manner in which the carriage is released from its home position so that the spring 11 will pull it into the "field" where the cassette, borne by the carriage, is properly disposed with respect to the X-ray beam for the desired exposure. Suffice it to say, however, that the carriage is always in a field position when the lugs or dogs 7 and 8 of the chain engage the arms 9 and 10, as shown in Fig. 3. The movement of the carriage in response to the driving action of the lugs against the bifurcated member results in the carriage reaching the position shown in Fig. 4 shortly before the return journey of the carriage to its home position has been completed. It will be noted in this figure that the lug 7 has not yet started to move around the sprocket wheel 5 and that the strike 12 is in engagement with the underside of the latching member 13, but that a position has not yet been reached in which the latch has created a block against the leftward movement of the strike 12, which is attached to the carriage by any appropriate means, such as the screws or rivets 14.

Figure 5:
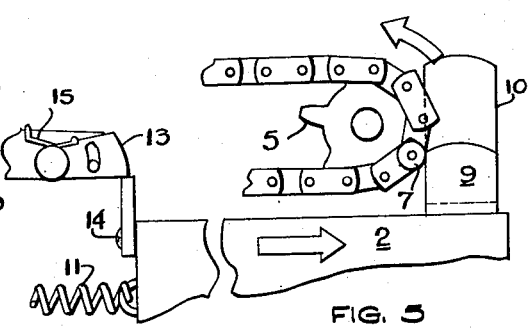
Fig. 5 shows the same parts pictured in Fig. 4, but with the chain advanced to a position just before the top lug on the chain becomes disengaged from the co-operating parts attached to the carriage.
Figure 6:
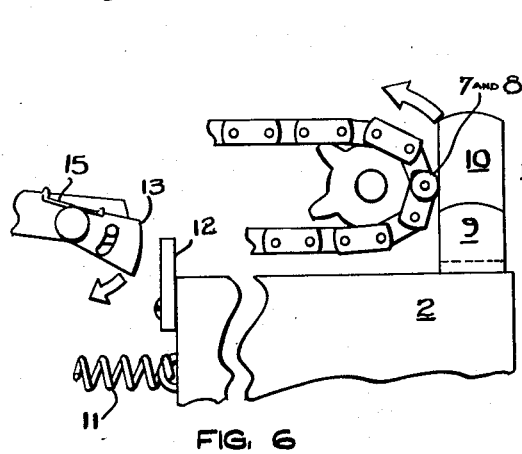
Fig. 6 shows the components of Figs. 4 and 5 as they appear when the carriage has reached the furthest position to which it may be moved by the lugs on the chain.
Figure 7:
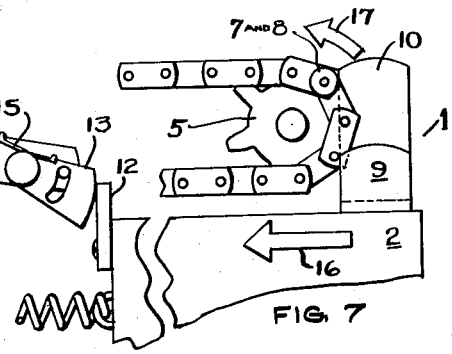
Fig. 7 shows the components of Figs. 4, 5 and 6 at the instant when the lower lug on the chain is breaking engagement with the cooperating parts on the carriage as the latter is latched in its home position against the action of the spring that moves the carriage toward the X-ray beam.

In Fig. 5, the lug 7 and the lug 8, directly beneath lug 7 and therefore not visible, have moved the carriage still further toward the left, and the lug 7 is about to move away from the arm 9 of the bifurcated member as the lug proceeds in a counter-clockwise direction around the driving sprocket 5. In previous arrangements that have been used for effecting the movement of the rectilinearly movable member to a given position through the action of a dog or lug upon a chain, a member similar to arm 9 has been provided, but there have been no components analogous or similar to the arm 10 and the lug 8 which cooperates therewith. As a consequence, the lug 7, or its equivalent, would leave member 9 as the lug proceeds around the sprocket, and the carriage would continue to move under its momentum or would be pulled back by a spring corresponding with spring 11. A suitable striker would then rest against the end of an appropriate latching member. The disengagement of the dog and the driven member in such an arrangement is not smooth, because the spring corresponding to spring 11 holds the member corresponding to arm 9 firmly against the lug, and the disengagement is consequently effected by a snapping action that is not desirable in a spot film device. In embodiments of my invention, however, the lower lug 8, Fig. 2, remains in engagement with the arm 10 of the bifurcated member 1 not only until the lug 8 has reached its extreme position as it moves around the axis of the sprocket 5, as shown in Fig. 6, but since arm 10 is free to pass beyond the end of the shaft 18 on which the driving sprocket is mounted, the engagement is maintained until after the lug has passed around center, as shown in Fig. 7. In Fig. 6, it will be seen that the carriage has been moved to its extreme right position and that the lugs on the chain are just passing over center—that is, that they are aligned with what might be called the symmetric axis, or axis of symmetry, of the chain assembly. In this position, the dogs or lugs may be said to have moved ninety degrees around the sprocket. It will also be seen in Fig. 6 that the latch 13 has now moved downward under action of the hair spring 15 and that the latch is consequently in position to intercept the leftward movement of the carriage under action of the spring 11, which will now have been stretched to its maximum length.

In Fig. 7, the arm 10 and the carriage 2 have followed the lug leftward in the direction shown by arrow 16 as the lugs have moved further around the sprocket 5 in the counter-clockwise direction indicated by the arrow 17. The latch 13 has now intercepted the striker 12, and the lugs will thenceforth move to the left free from engagement with the arms of the bifurcated member.

It will be clear from an examination of Figs. 6 and 7 that there is no abrupt disengagement of the lugs and the bifurcated member 1, but that the carriage has been dropped gently to rest in its final position with the strike 12 abutting against the end of latch 13.

It is of course not essential to the practice of my invention that a chain be the specific means for carrying the dogs or lugs, and that substitute moving members might be used, such, for example, as an endless belt or cable or pairs of cables or belts. Various other substitutions, as well as additions and reversals of parts, may likewise be made from the combinations set forth in the appended claims without departing from the broad spirit of my invention.

My claims are:

1. In a spot film device, instrumentalities for returning the carriage from the vicinity of the X-ray beam to its rest position outside the beam, said instrumentalities including: means for yieldably holding said carriage in the vicinity of said X-ray beam; a sprocket disposed adjacent the rest position of said carriage; an endless chain passing around and engaging said sprocket and extending generally parallel to the path of movement of said carriage; a member attached to and extending from said carriage for a distance that is greater than the minimum distance between said carriage and the axis of said sprocket; a strike attached to said carriage; a latch; a spring for urging said latch into the path of said strike; said strike acting to cam said latch aside upon movement of said carriage in one direction and to abut against said latch when the carriage, after the strike has passed the latch in said one direction, is moved in the opposite direction; and a lug extending from said chain in a direction parallel to said axis, said lug acting to engage said member and move said carriage toward its rest position upon movement of said chain in one direction, said lug remaining in contact with said member until the lug has moved more than 90 degrees around said sprocket.

2. In a spot film device, instrumentalities for returning the carriage from the vicinity of the X-ray beam to its rest position outside the beam, said instrumentalities including: means for yieldably holding said carriage in the vicinity of said X-ray beam; a sprocket disposed adjacent the rest position of said carriage; an endless chain passing around and engaging said sprocket and extending generally parallel to the path of movement of said carriage; a member attached to and extending from said carriage for a distance that is greater than the minimum distance between said carriage and the axis of said sprocket; a strike attached to said carriage; a latch; a spring for urging said latch into the path of said strike; said strike acting to cam said latch aside upon movement of said carriage against the action of said means; and a lug extending from said chain in a direction parallel to said axis, said lug acting to engage said member and move said carriage toward its rest position upon movement of said chain in a direction opposite to the direction of the force exerted by said means, said lug remaining in contact with said member as the lug moves around said sprocket until said strike abuts against said latch during the initial part of the reverse movement of said carriage as a result of the action of said means.

3. In a spot film device, instrumentalities for returning the carriage from the vicinity of the X-ray beam to its rest position outside the beam, said instrumentalities including: means for yieldably holding said carriage in the vicinity of said X-ray beam; a sprocket disposed adjacent the rest position of said carriage; an endless chain passing around and engaging said sprocket and extending generally parallel to the path of movement of said carriage; a bifurcated member attached to said carriage and straddling one side of said chain, the free end of one arm of said member being further from said carriage than is the center of rotation of said sprocket when said carriage is in its rest position; a strike attached to said carriage; a latch; a spring for urging said latch into the path of said strike; said strike acting to cam said latch aside upon movement of said carriage in one direction and to abut against said latch when the carriage, after the strike has passed the latch in said one direction, is moved in the opposite direction; lugs extending from said chain in opposite directions parallel to the axis of said sprocket, said lugs each acting to engage a different arm of said member and move said carriage toward its rest position upon movement of said chain in one direction, the lug that engages the aforementioned one arm of said member remaining in contact with said one arm until the last mentioned lug has moved at least 90 degrees around said sprocket from the point where it leaves the relatively long straight portion of its travel as the carriage approaches its rest position.

4. In a spot film device, instrumentalities for returning the carriage from the vicinity of the X-ray beam to its rest position outside the beam, said instrumentalities including: means for yieldably holding said carriage in the vicinity of said X-ray beam; a sprocket disposed adjacent the rest position of said carriage; an endless chain passing around and engaging said sprocket and extending generally parallel to the path of movement of said carriage; a bifurcated member attached to said carriage and straddling one side of said chain, the free end of one arm of said member being further from said carriage than is the center of rotation of said sprocket when said carriage is in its rest position; a strike attached to said carriage; a latch; a spring for urging said latch into the path of said strike; said strike acting to cam said latch aside upon movement of said carriage against the action of said means; lugs extending from said chain in opposite directions parallel to the axis of said sprocket, said lugs each acting to engage a different arm of said member and move said carriage toward its rest position upon movement of said chain in a direction opposite to the direction of the force exerted by said means, said lug remaining in contact with said member as the lug moves around said sprocket until said strike abuts against said latch during the initial reverse movement of said carriage as a result of the action of said means.

References Cited in the file of this patent
UNITED STATES PATENTS 2,709,221    Haupt _____ May 24, 1955